(12) United States Patent
Lafontaine

(10) Patent No.: US 7,207,749 B2
(45) Date of Patent: Apr. 24, 2007

(54) METHOD AND APPARATUS FOR INSTALLING UNDERGROUND PIPE

(76) Inventor: Stephen J. Lafontaine, 13736 Dogwood Ct., Chino, CA (US) 91710

(*) Notice: Subject to any disclaimer, the term of this patent is extended or adjusted under 35 U.S.C. 154(b) by 0 days.

(21) Appl. No.: 11/409,166

(22) Filed: Apr. 21, 2006

(65) Prior Publication Data

US 2006/0188340 A1    Aug. 24, 2006

Related U.S. Application Data

(62) Division of application No. 10/798,647, filed on Mar. 11, 2004.

(51) Int. Cl.
*F16L 1/00* (2006.01)

(52) U.S. Cl. .................. 405/184; 405/174

(58) Field of Classification Search ........... 405/174, 405/184, 184.1–184.5; 175/19, 22, 23
See application file for complete search history.

(56) References Cited

U.S. PATENT DOCUMENTS

| 58,721 | A | * | 10/1866 | Duck et al. | 175/22 |
| 73,688 | A | * | 1/1868 | Arnold | 175/22 |
| 99,858 | A | * | 2/1870 | Danforth | 175/19 |
| 1,894,446 | A | * | 1/1933 | McKenny | 173/112 |

FOREIGN PATENT DOCUMENTS

WO       0294740    * 12/1988

* cited by examiner

*Primary Examiner*—Sunil Singh
(74) *Attorney, Agent, or Firm*—Robert R. Meads (57) ABSTRACT

A method and apparatus employing an axially elongated ground piercing tool for forming an in-ground tunnel under a surface structure with forward axial movement of the tool in the ground under the structure with a pipe carried by the tool for depositing in the tunnel after a removal of a tip of the tool and a rearward pulling of the remainder of the tool from the tunnel.

1 Claim, 6 Drawing Sheets

METHOD AND APPARATUS FOR INSTALLING UNDERGROUND PIPE

RELATED APPLICATION

This application is a division of U.S. application Ser. No. 10/798,647, filed Mar. 11, 2004 by the same sole inventor-applicant claiming the same small entity status, copies of the original declaration and claim for small entity status filed Mar. 11, 2004 being submitted with this application.

FIELD OF INVENTION

The present invention relates to a method and apparatus for installing underground pipe and, more particularly, to a method, system and system components for installing underground pipe under existing surface structures.

BACKGROUND OF INVENTION

The inventor of the method, system and system components for installing underground pipe under existing surface structures described herein, also is the inventor of the earth piercing tool covered by U.S. Pat. No. 5,950,739 issued Sep. 14, 1999, the subject matter of which is incorporated herein as background to the present invention.

The present invention incorporates an improved version of the patented earth piercing tool which is particularly useful in a method and system for installing underground pipe under existing surface structures such as driveways, curbs, sidewalks, concrete slabs, building foundations and the like.

SUMMARY OF INVENTION

The present invention comprises a method and system that are particularly useful in installing underground pipe under pre-existing surface structures. Basically, the method and system employs an axially elongated ground-piercing tool for forming an in-ground tunnel under a surface structure with forward axial movement of the tool in the ground under the structure. The tool includes a removable pointed tip portion threaded to a threaded forward end portion of an axially extending rod portion of the tool. A pipe is carried by the rod and is secured between the tip and an end cap for the rod. After the tunnel is formed, the pipe is placed in the tunnel by removal of the tip from the rod and by a rearward pulling of the rod from the tunnel leaving the pipe in place.

BRIEF DESCRIPTION OF DRAWINGS

FIGS. 4–7 diagrammatically depict the method of installing underground pipe under an existing surface structure with the system and components of the present invention.

DETAILED DESCRIPTION OF INVENTION

In the drawings, FIGS. 4–7 depict a sequence of steps comprising a method for installing a pipe 10 under a pre-existing surface structure 12. By way of example only, the illustrated structure 12 comprises a concrete sidewalk 14 on a preformed horizontally extending bed 16 slightly below a ground surface 18

An object of the method of the present invention as depicted in FIGS. 4–7 is to place the pipe 10 in the ground under the sidewalk 14. A first step in the illustrated method is to form in-ground trenches 20 and 22 on the right and left sides of the sidewalk 14. This may be accomplished by hand digging of the trenches or formation of the trenches with a backhoe or other mechanical device. The purpose of the trenches 20 and 22 is to expose ground on opposite side of the sidewalk 14 to a ground piercing system 24 according to the present invention.

Figure 1:
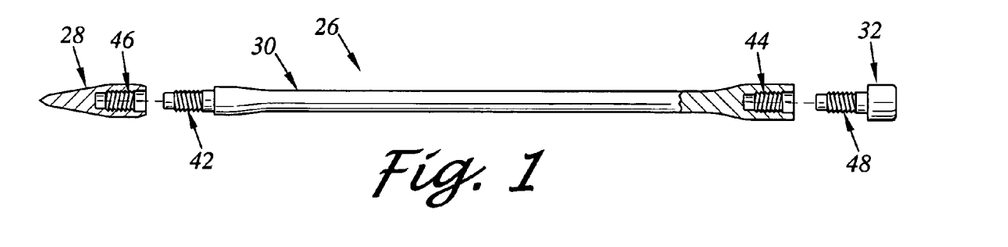
FIG. 1 is an exploded side view, partially in section, of a preferred form of the ground tunneling tool included in the system of the present invention.

A major component of the system 24 is an axially elongated earth piercing tool 26, such as shown in FIG. 1. As will be hereafter described in greater detail, the illustrated tool 26 comprises a pointed tip 28 releasably connected to a forward end of a rod 30 and an end cap 32 releasably connected to a rear end of the rod.

Figure 4:
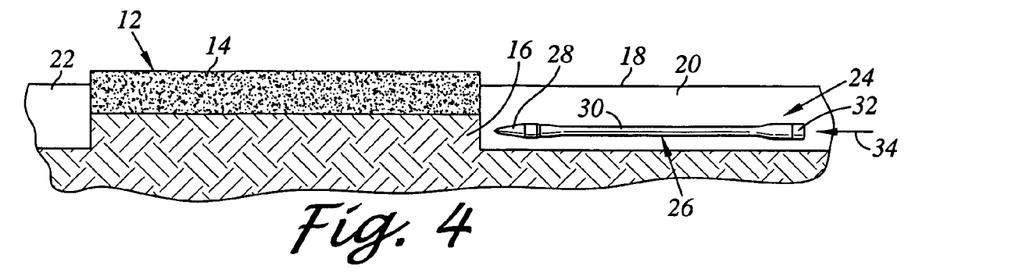
FIG. 4 depicts a side view of a section of ground having a surface structure thereon and the ground piercing tool in an open trench to a right side of the structure.

As illustrated in FIG. 4, the tool 26 is placed in the trench 20 with the tip 28 facing toward the trench 22. Then, as indicated by the arrow 34, the tool 26 is driven to the left through the ground under the sidewalk 14 as by striking the end cap 32 of tool with a sledgehammer or other suitable rod-driving tool or mechanism. In moving through the ground, the tool 26 forms an in-ground tunnel 36, under the sidewalk 14.

Figure 5:
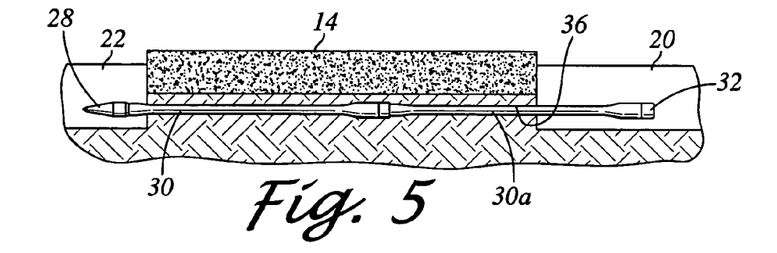
FIG. 5 depicts the tool of FIG. 4 having been driven under the structure with a pointed tip end of the tool extending into an open trench on a left side of the structure, the tool having a rod extension connected to the rod shown in FIG. 4.

As depicted in FIGS. 4 and 5, the tool 26 is shorter in length than the width of the sidewalk 14. Therefore, in order to form the tunnel 36 completely under the sidewalk 14, a second or extension rod 30a is added to the tool 26 during the formation of the tunnel 36. For example, after the tool 26 is driven forward under the sidewalk 14 and the pointed tip 28 reaches a mid-point under the sidewalk, the end cap 32 is removed from the rod 30 and the extension rod 30a is releaslably connected to the rod 30. The end cap 32 is then connected to a rear end of the extension rod 30a and the driving of the tool 26 continued until the tip 28 extends into the trench 22 as depicted in FIG. 5.

Figure 6:
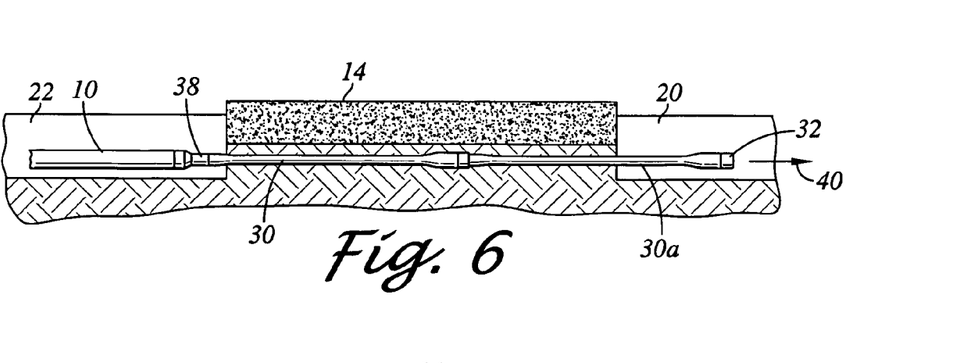
FIG. 6 depicts the side view of FIG. 5 after the pointed tip of the tool has been removed and replaced by a pipe connector connected to a length of pipe.

The pointed tip 28 is then removed from the forward end of the rod and replaced by a pipe connector 38. The pipe connector 38 may be pre-connected to an end of the pipe 10 or may be connected to the pipe after connection to the rod 30. FIG. 6 depicts the pipe connector 38 with the pipe 10 releasably connected to a forward end thereof and the rod 30 releasably connected to a rear end thereof.

Figure 7:
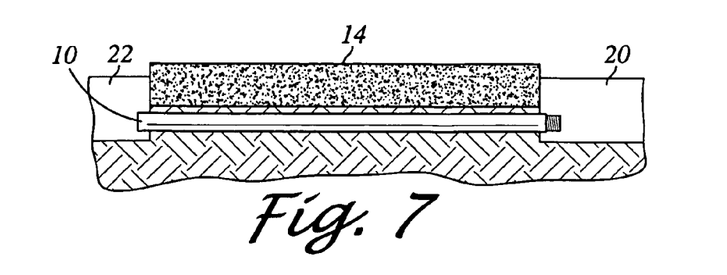
FIG. 7 depicts the structure of FIG. 6 after the tool has been pulled to the right to pull the pipe into the in-ground tunnel formed by the tool and after the tool and pipe connector have been removed from the pipe.

As represented by the arrow 40 in FIG. 6, with the pipe 10, pipe connector 38 and tool 26 connected as shown in FIG. 6, a rearward pulling force is exerted on the tool 26 to pull the pipe 10 into and through the in-ground tunnel 36 under the sidewalk 14. The pipe connector 38 is then removed from the pipe 10 leaving the pipe in the tunnel 36 as depicted in FIG. 7.

Referring now more specifically to the earth piercing system 24 for performing the method illustrated in FIGS. 4–7, FIG. 1 illustrates the system 24 as comprising the rod 30 having a forward threaded end portion 42 and a rear threaded end portion 44. The forward end portion 42 is designed to releasably connect to a rear threaded end portion 46 of the pointed tip 28 while the rear end portion 44 is designed to releasably connect to a forward threaded end portion 48 of the end cap or to a forward threaded end of an extension rod such as 30a in FIG. 5. As described with respect to the method illustrated in FIGS. 4–7, the forward end portion 42 of the rod 30 also is designed to releasably connect to a rear threaded end portion 50 of the pipe connector 38.

Figure 2:
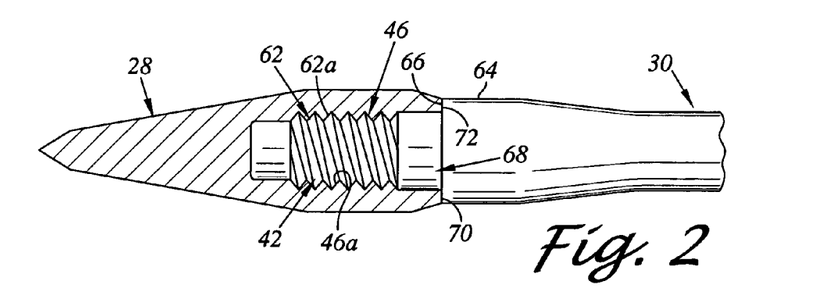
FIG. 2 is an enlarged side view, partially in section, of a forward end portion of the tool shown in FIG. 1, comprising a pointed tip portion threaded to a threaded forward end portion of an axially extending rod of the tool.

A first preferred design for the forward threaded end portion 42 of the rod 30 and rear threaded end portion 46 of the tip 28 is depicted in FIG. 2. As shown, the end portion 42 comprises an axially extending externally threaded extension 62. As depicted, the extension 62 has a reduced diameter relative to an adjacent forward end 64 of the rod 30 so as to define an annular forward facing radial shoulder 66 outward of the extension. External threads 62a on the extension 62 are designed to screw into and mate with internal threads 46a in a rear axially extending socket 68 in the tip 28 defining the rear threaded end portion 46 of the tip. Further as shown in FIG. 2, a rear facing radially extending annular end 70 of the tip 28 outside of the socket 68 defines an end surface 72 engaging the shoulder 66 when the extension 62 is fully threaded into the socket. Thus connected, axial impact forces exerted on the rod 30 as it is driven under the sidewalk 14 are transmitted by the shoulder 66 and end 72 connection to the forward end of the tip 28 to relieve axial forces on the mating threads of the extension 62 and socket 68.

Figure 2A:
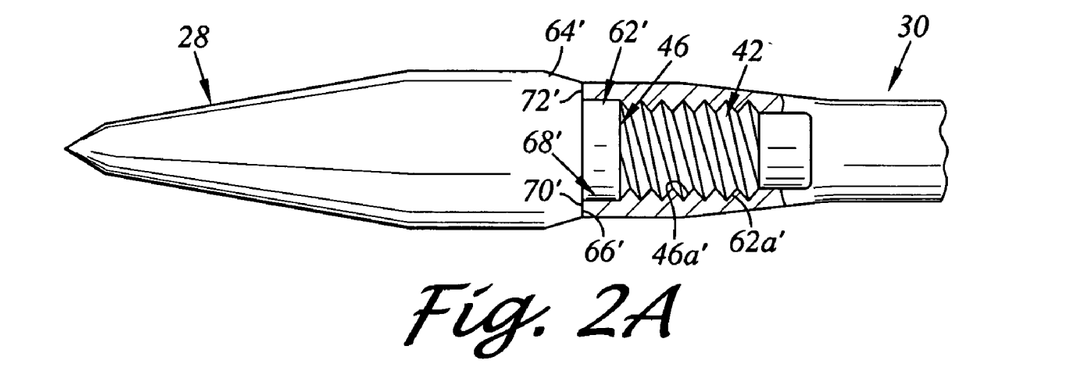
FIG. 2A is an enlarged side view, partially in section, of an alternate forward end portion of the tool similar to that shown in FIG. 2, comprising a pointed tip portion threaded to a threaded forward end portion of an axially extending rod of the tool.
Figure 3:
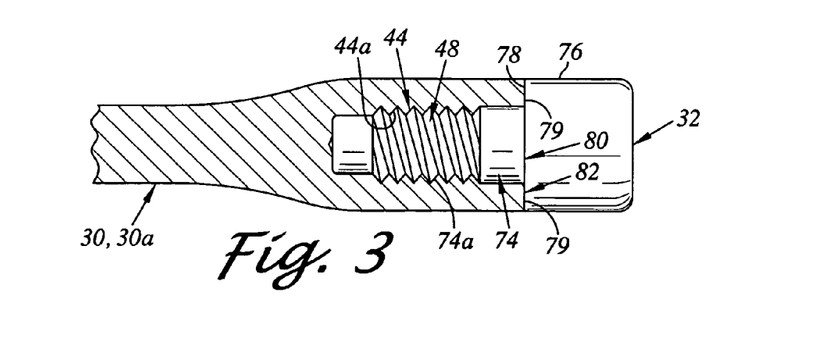
FIG. 3 is an enlarged side view, partially in section, of a rearward end portion of the tool shown in FIG. 1, comprising a rear threaded end portion of the rod of the tool and a threaded end cap for the tool

A similar connection exists between the end cap 32 and rod 30 or extension 30a as depicted in FIG. 3. With regard to the extension 30a, it may be connected to the rod 30 in the same manner that the rod 30 is connected to the tip 28 as described relative to FIG. 2 or it may be connected in the manner that the rod 30 is connected to the tip 28 as will be described relative to FIG. 2A. In either event, as shown in FIG. 3, the end cap 32 comprises an axially extending externally threaded extension 74. As depicted, the extension 74 has a reduced diameter relative to an adjacent forward end 76 of the cap 32 so as to define an annular forward facing radial shoulder 78 outward of the extension. External threads 74a on the extension 74 are designed to screw into and mate with internal threads 44a in a rear axially extending socket 80 in the rod 30 or extension 30a defining the rear threaded end portion 44 of the rod. Further as shown in FIG. 3, a rear facing radially extending annular end 82 of the rod 30 or extension 30a outside of the socket 80 defines an end surface 79 engaging the shoulder 78 when the extension 74 is fully threaded into the socket. Thus connected, axial impact forces exerted on the cap 32 as it is driven forward are transmitted by the shoulder 78 and end surface 79 connection to the forward end of the tip 28 to relieve axial forces on the mating threads of the extension 74 and socket 80.

A second preferred design for the forward threaded end portion 42 of the rod 30 and rearward threaded end portion 46 of the tip 28 is depicted in FIG. 2A. As shown, the end portion 46 of the tip 28 comprises an axially extending externally threaded rear extension 62'. As depicted, the rear extension 62' has a reduced diameter relative to an adjacent forward end 64' of the tip 28 so as to define an annular rear facing radial shoulder 66' outward of the extension. External threads 62a' on the extension 62' are designed to screw into and mate with internal threads 46a' in a forward axially extending socket 68' in the rod 30 defining the forward threaded end portion 42 of the rod. Further as shown in FIG. 2A, a forward facing radially extending annular end 70' of the rod 30 outside of the socket 68' defines an end surface 72' engaging the shoulder 66' when the extension 62' is fully threaded into the socket. Thus connected, axial impact forces exerted on the rod 30 as it is driven under the sidewalk 14 are transmitted by the shoulder 66' and end surface 72' connection to the forward end of the tip 28 to relieve axial forces on the mating threads of the extension 62' and socket 68'.

Figure 3A:
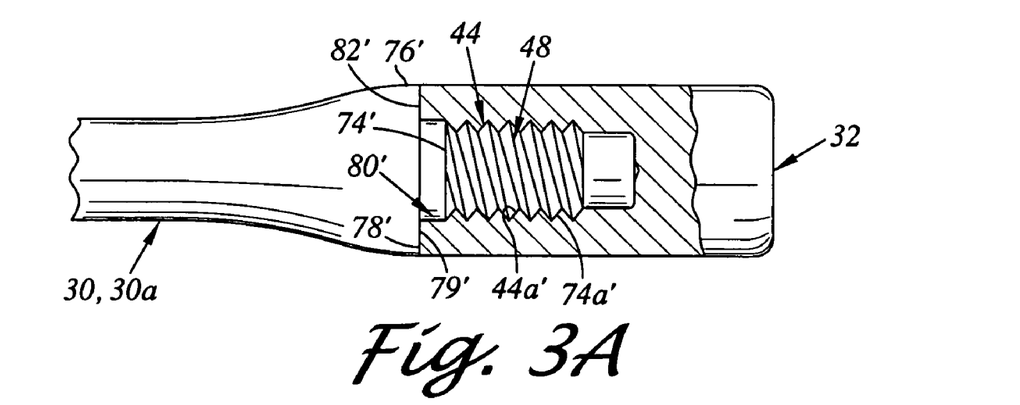
FIG. 3A is an enlarged side view, partially in section, of an alternate rearward end portion of the tool similar to that shown in FIG. 3, comprising a rear threaded end portion of the rod of the tool and a threaded end cap for the tool.

A similar connection exists between the end cap 32 and rod 30 or extension 30a as depicted in FIG. 3A. As shown in FIG. 3A, the rod 30 or extension 30a comprises an axially extending externally threaded extension 74'. As depicted, the extension 74' has a reduced diameter relative to an adjacent rear end 76' of the rod 30 or extension 30a so as to define an annular rear facing radial shoulder 78' outward of the extension. External threads 74a' on the extension 74' are designed to screw into and mate with internal threads 44a' in a forward axially extending socket 80' in the end cap 32 defining the rear threaded end portion 44 of the rod or extension. Further as shown in FIG. 3A, a forward facing radially extending annular end 82' of the end cap 32 outside of the socket 80' defines an end surface 79' engaging the shoulder 78' when the extension 74' is fully threaded into the socket. Thus connected, axial impact forces exerted on the cap 32 as it is driven forward are transmitted by the shoulder 78' and end surface 79' connection to the forward end of the tip 28 to relieve axial forces on the mating threads of the extension 74' and socket 80'.

As previously described with respect to the method of FIGS. 4–7, the system 24 also comprises the pipe connector 38. Specifically, FIG. 6 shows the pipe connector 38 connected to the rod 30 and to the pipe 10. Preferably, such connections are provided by the rear threaded end portion 50 of the connector releasably engaging the forward threaded end portion 42 of the rod 30 and a forward threaded end portion 52 of the pipe connector 38 engaging a threaded outer rear end 56 of the pipe (see FIG. 8) or a rear interior thread 58 formed in a rear interior 60 of the pipe by a forward threaded end portion 52' of the pipe connector (see FIG. 9).

Figure 8:
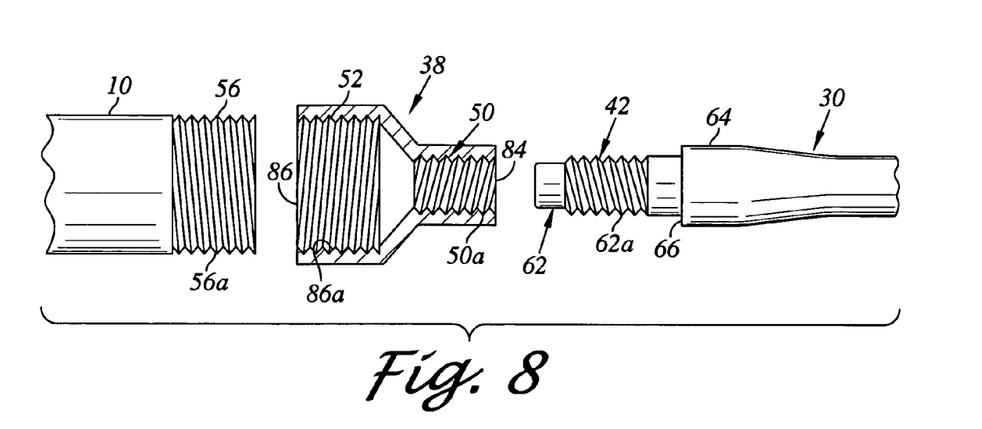
FIG. 8 is an enlarged exploded side view of an externally threaded forward end portion of the rod and a pipe connector having an internally threaded rear end portion for mating with the rod and an internally threaded forward end for mating with a threaded end of a pipe.

A first preferred design for the forward threaded end portion 42 of the rod 30 and the rear threaded end portion 50 of a metal-to-metal version of the pipe connector 38 for a metal pipe is depicted in FIG. 8. As previously described relative to FIG. 2, the end portion 42 comprises the axially extending externally threaded extension 62. As depicted, the extension 62 has a reduced diameter relative to an adjacent forward end 64 of the rod 30 so as to define the annular forward facing radial shoulder 66 outward of the extension. External threads 62a on the extension 62 are designed to screw into and mate with internal threads 50a in a rear axially extending socket 84 of the pipe connector 38 defining the rear threaded end portion 50 of the connector. Thus, the pipe connector 38 of FIG. 8 is releasably connectable to the rod 30.

Further as shown in FIG. 8, the pipe connector 38 comprises a forward facing axially extending socket 86 having internal threads 86a designed to screw onto and mate with the external threads 56a on the rear end of the pipe 10.

With the connector 38 thus connected between the pipe 10 and the rod 30, rearward axial forces exerted on the rod 30 will be transmitted through the pipe connector 38 to the pipe 10 to pull the pipe through the tunnel 36 under the sidewalk 14 as depicted in FIG. 6.

Figure 8A:
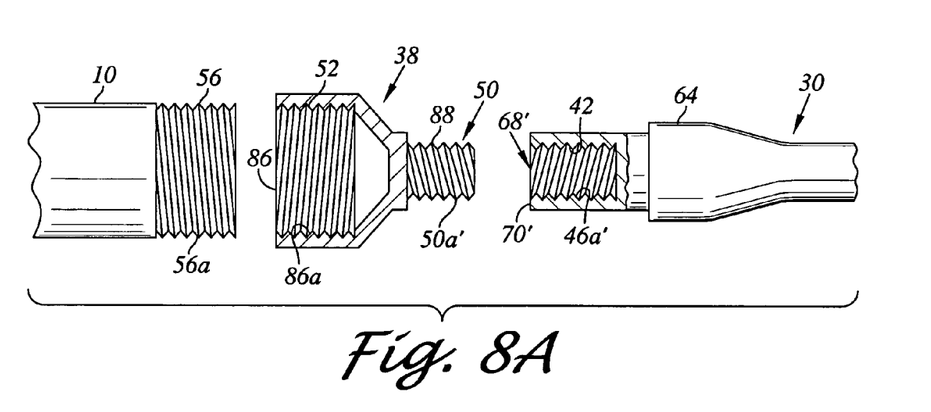
FIG. 8A is an enlarged exploded side view of an internally threaded forward end portion of the rod and a pipe connector having an externally threaded rear end portion for mating with the rod and an internally threaded forward end for mating with a threaded end of a pipe.

A similar connection exists between the metal pipe 10 and an alternate forms of the pipe connector 38 and rod 30 as depicted in FIG. 8A. As there illustrated, the rear threaded end portion of the pipe connector 38 of FIG. 8A comprises an axially extending externally threaded rear extension 88. External threads 50a' on the rear extension 88 are designed to screw into and mate with the internal threads 46a' in the axially extending forward'socket 68' in the rod 30 depicted in FIG. 2A. With the rear threaded end of the pipe connector 38 thus connected to the rod 30 and with the forward threaded end portion 52 of the pipe connector 38 connected to the pipe as described relative to FIG. 8, rearward axial forces exerted on the rod 30 will be transmitted through the pipe connector 38 to the pipe 10 to pull the pipe through the tunnel 36 under the sidewalk 14 as depicted in FIG. 6.

Figure 9:
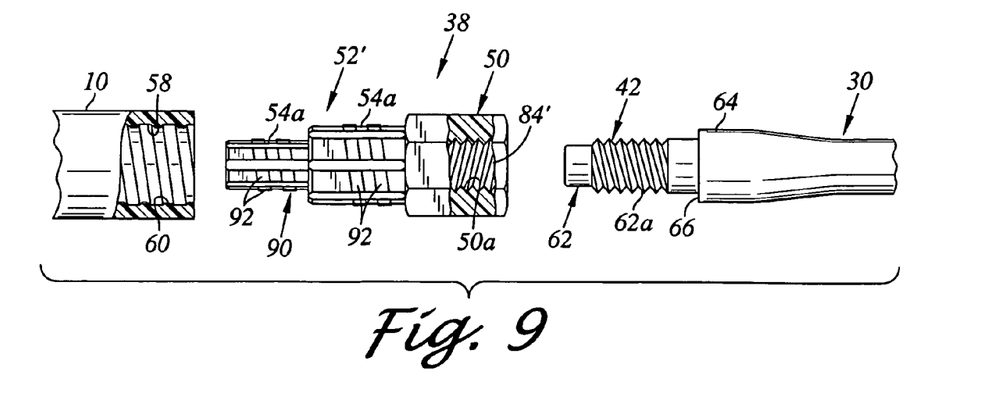
FIG. 9 is an enlarged exploded side view of an externally threaded forward threaded end portion of the rod and a pipe connector having an internally threaded rear end portion for mating with the rod and a forward end carrying self tapping threads for forming internal threads and mating with an end of a plastic pipe.

A first preferred design for the forward threaded end portion 42 of the rod 30 and the rearward end portion 50 of a metal-to-plastic pipe connector 38 for a plastic pipe is depicted in FIG. 9. As previously described relative to FIG. 2, the end portion 42 comprises the axially extending externally threaded extension 62. As depicted, the extension 62 has a reduced diameter relative to an adjacent forward end 64 of the rod 30 so as to define the annular forward facing radial shoulder 66 outward of the extension. External threads 62a on the extension 62 are designed to screw into and mate with internal threads 50a in a rear axially extending socket 84' of the pipe connector 38 defining the rear threaded end portion 50 of the connector. Thus, the pipe connector 38 of FIG. 9 is releasably connectable to the rod 30.

Further, in FIG. 9, the pipe connector 38 is illustrated as comprising an axial forward extension 90 defining the forward threaded portion 52' of the connector. As depicted, the extension 90 is radially stepped including a front portion 54 of relative small diameter and a rear portion 54a of relative large diameter. The portions 54 and 54a carry conventional thread cutting teeth 92 for cutting threads in the interior of the open end of a plastic pipe. For example, the diameter of the teeth 92 carried by the portion 54a of the extension 92 are designed to cut threads such as 58 in the plastic pipe 10 upon a turning of the pipe connector 38 relative to the pipe 10 with the portion 54a of the extension 90 within the pipe. The teeth 92 carried by the portion 54 are for cutting similar threads in a narrower plastic pipe (not shown).

Once the teeth 92 on the portion 54a of the pipe connector have formed the thread 58, the pipe is secured to the pipe connector. Then, with the rod 30 secured to the pipe connector 38 in the manner previously described, rearward axial forces exerted on the rod will be transmitted through the pipe connector to the pipe 10 to pull the pipe through the tunnel 36 under the sidewalk 14 as depicted in FIG. 6.

Figure 9A:
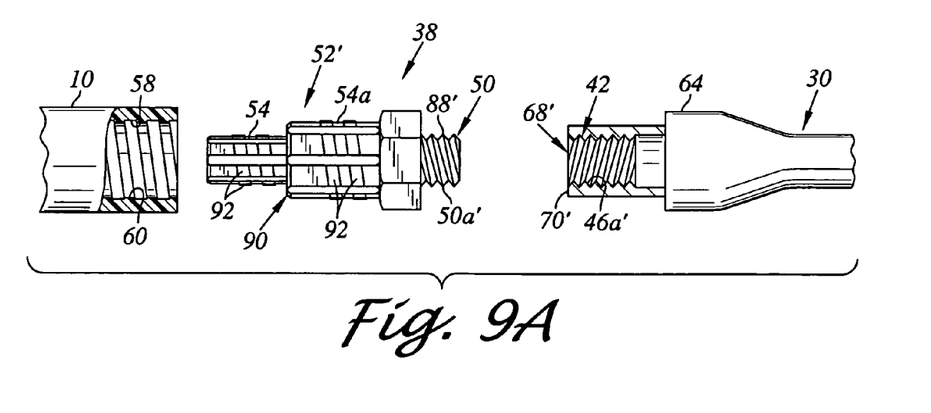
FIG. 9A is an enlarged exploded side view of an internally threaded forward end portion of the rod and a pipe connector having an externally threaded rear end portion for mating with the rod and a forward end carrying self tapping threads for forming internal threads and mating with an end of a plastic pipe.

A similar connection exists between the plastic pipe 10 and an alternate form of the pipe connector 38 and rod 30 as depicted in FIG. 9A. As there illustrated, the forward end portion 52 of the pipe connector 38 conforms that that shown and described relative to FIG. 9. However, the rear threaded end portion of the pipe connector 38 of FIG. 9A comprises an axially extending externally threaded rear extension 88' like the extension 88 in FIG. 8A. As in FIG. 8A, external threads 50a' on the rear extension 88' are designed to screw into and mate with the internal threads 46a' in the axially extending forward socket 68' in the rod 30 as depicted in FIGS. 2A and 8A.

With the rear threaded end of the pipe connector 38 thus connected to the rod 30 and with the forward threaded end portion 52 of the pipe connector 38 connected to the pipe as described relative to FIG. 8, rearward axial forces exerted on the rod 30 will be transmitted through the pipe connector 38 to the pipe 10 to pull the pipe through the tunnel 36 under the sidewalk 14 as depicted in FIG. 6.

Figure 10:
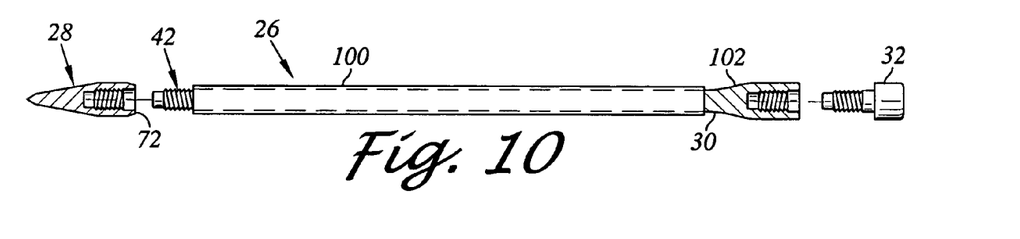
FIG. 10 is a view similar to FIG. 1 with a pipe on the rod of the ground piercing tool.
Figure 11A:
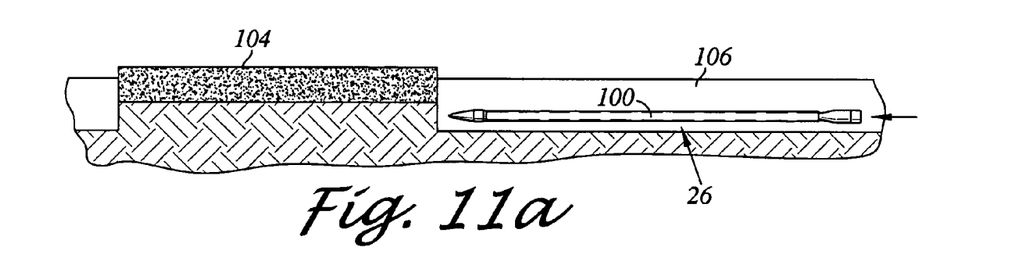
FIGS. 11a–c illustrate the method of driving the tool and pipe combination under a sidewalk and then removing the tool leaving the pipe in place.
Figure 11B:
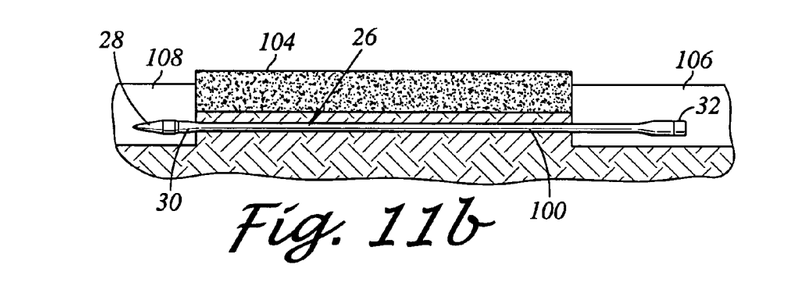
Figure 11C:
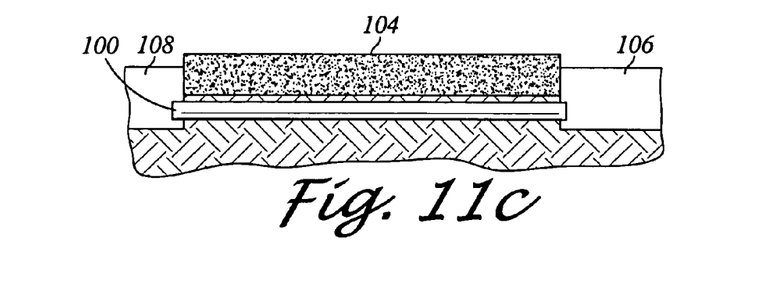

While in the foregoing, preferred embodiments of the present invention and preferred modes of operation thereof have been described and illustrated in detail, changes and modifications may be made without departing from the spirit of the present invention. For example, when installing relatively short lengths of pipe under relatively narrow structures, such as narrow sidewalks, the forward end portion 42 of the rod 30 of the ground piercing tool 26 can be dimensioned to fit within such a pipe 100 as depicted in FIG. 10. Under such circumstances, after the tip 28 of the tool 26 has been removed from the rod 30, the forward end of the rod may be inserted into the pipe 100 and the tip 28 reconnected to the rod. Then, as shown in FIG. 10, the pipe 100 is fully mounted on and carried by the rod 30 between the end surface 72 of the tip and the outwardly enlarged end portion 102 of the rod connected to the end cap 36. Thus positioned, the pipe 100 may be driven with the tool 26 under a sidewalk 104 as depicted in FIGS. 11a–c. As illustrated, such a tool/pipe combination may be placed in a preformed trench 106 on one side of the sidewalk 104. The tool 26 may be driven under the sidewalk 104 in the manner previously described until the tip 28 extends into a pre-formed trench 108 on an opposite side of the sidewalk 104. Then, the tip 28 may be removed from the rod 30 and the rod pulled rearward into the trench 106 leaving the pipe 100 in place under the sidewalk.

Accordingly the present invention is to be limited in scope only by the following claims.

The invention claimed is:

1. A method for installing underground pipe under a ground supported structure using a ground piercing tool comprising a pointed tip releasably connected to a forward end of a rod having a forward end portion dimensioned to fit within the pipe and having an outwardly enlarged rear end portion, the method comprising the steps of:

pre-mounting the pipe on the ground piercing tool by removing the tip from the forward end of the rod and inserting the forward end portion of the rod into the pipe until the pipe is carried by the rod between the outwardly enlarged rear end portion of the rod and an end surface of the tip following reconnection of the tip to the forward end of the rod;

forming first and second trenches in the ground on opposite sides of the structure;

placing the ground piercing tool in the first trench with the tip or end portion of the tool facing the second trench;

driving the tool through the ground under the structure toward the second trench until the tip extends into the second trench and the tool forms an in-ground tunnel between the first and second trenches;

removing the tip from the rod; and pulling the rod rearward into the first trench leaving the pipe in place in the in-ground tunnel.

\* \* \* \* \*